Patented Aug. 7, 1934

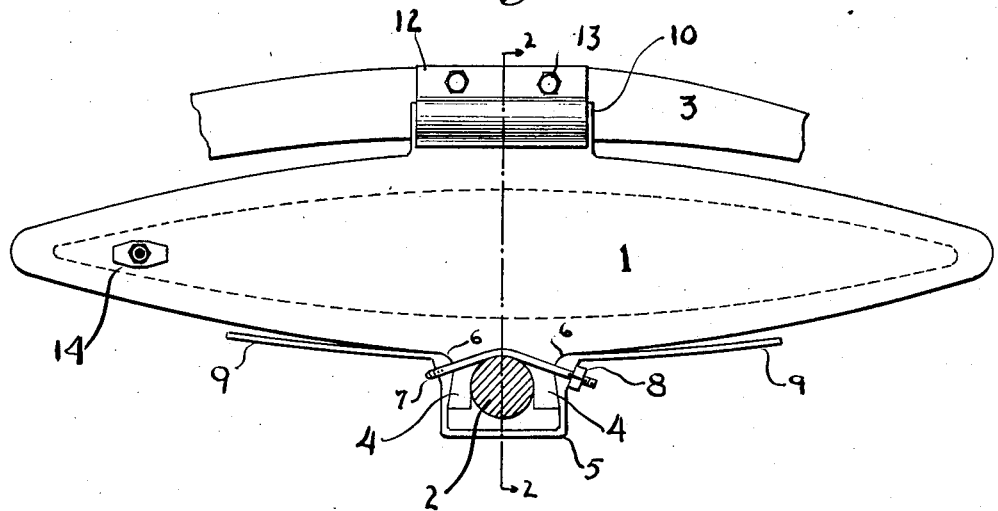
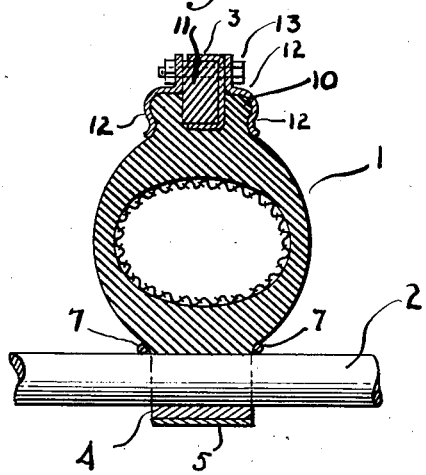

1,969,490

UNITED STATES PATENT OFFICE 1,969,490

PNEUMATIC SUSPENSION DEVICE

Dietrich Friedrich Otto Wesemeyer, Fords, N. J.

Application July 19, 1933, Serial No. 681,112

5 Claims. (Cl. 267—35)

The present invention relates to a pneumatic suspension device especially adapted for use on automobiles.

It is an object of the present invention to provide a pneumatic suspension device which possesses excellent resiliency, which insures good riding comfort and which eliminates metal springs and the accompanying noises and necessity for oiling, greasing, etc.

It is another object of the invention to provide a pneumatic suspension device which may be easily assembled and installed on a vehicle and demounted therefrom.

It is a further object of the present invention to provide a pneumatic suspension device which is capable of having its resiliency and resistance to shock adjusted at the will of the operator according to the particular conditions including the kind of a road over which the car is traveling, the load in the car, and other pertinent factors.

It is also within the contemplation of the present invention to provide a pneumatic suspension device which is simple in design and construction and which is economical in manufacture.

Other objects and advantages of the invention will become apparent from the following description taken in conjunction with the drawing, in which:

Fig. 1 illustrates an elevational view of a pneumatic suspension device embodying the present invention and positioned between the axle and chassis of an automobile; and Fig. 2 is a sectional view taken through the line 2—2 in Fig. 1.

In the drawing, reference character 1 designates an elongated pneumatic tube resting on an axle 2 and supporting the chassis channel beam 3 of a vehicle, such as an automobile (not shown). The pneumatic tube is provided with strong flexible side walls, preferably constructed of rubber and fabric and adapted to withstanding the internal pressure within the tube and the various stresses due to jars, shocks and jolts from the road and due to the variations in the speed and changes in the direction of travel of the vehicle. The internal air space within the tube is preferably oval shaped with its major axis parallel to axle 2 and its minor axis substantially perpendicular to said axle and channel. The wall of the said air space is thickest at the top and bottom where the main stresses are to be carried, and then tapers toward the sides.

The lower side of the tube is provided with two downwardly projecting tongues 4 forming a recess therebetween adapted to receive the axle 2 of the automobile. These tongues are preferably wedge shaped with the larger ends projecting downward so that a locking and protecting shield 5, extending around the axle and skirting the bottom of the tube may have its corners 6 fit snugly into the recesses formed thereby. A clamping member 7, which extends over the axle and under the shield is adjustably bolted to securely hold the corners of the protecting shield snugly and rigidly in place. By the use of this arrangement, it is merely necessary to tighten a nut and bolt 8 on each side of the tube in order to secure the device to the axle. There is no need of a complicated attachment when the foregoing fastening means is used.

Extended leaves 9 of the protecting shield are adapted to reinforce the pneumatic tube especially when severe bumps, etc. are encountered which tend to tilt the tube forward or backward. This feature cooperates to give smoother riding qualities and to support the tube and extend the life thereof.

From the upper portion of the pneumatic tube extend two longitudinal projections terminating in beads 10. The recess formed by these projections, is adapted to receive the channel beam 3 of the automobile chassis which has a solid member 11 preferably made of rubber and fitted in between its two flanges. The channel beam forms a foundation to which the pneumatic suspension device may be attached. Clinchers 12 are provided to secure the tube to the chassis channel by bolting the beads 10 of the upper projections of the pneumatic tube to the channel beam and foundation member 11 by means of a plurality of nuts and bolts 13 which pass therethrough. In this manner the entire device is held securely and safely so that it is practically impossible to break apart.

It is to be observed that the major portion of the load passes directly from the lower flange of the channel beam to the tube and axle, thus relieving the clinchers and bolts from the major stresses. In this connection, it is also to be noted that the major portion of the load passes directly through the device as a compression stress to the axle thus preventing undue stresses in the clamping member 7 and the protecting shield.

In order to inflate the tube to the proper pressure, a valve 14 is provided preferably at one end of the tube where it is readily available. All the pneumatic tubes on the automobile may be interconnected and attached to a conveniently located central station. In this way it is possible to adjust the pressure in the tubes according to the load in the car and the qualities of the particular road over which the car is traveling. Thus, easy and smooth riding is assured for all conditions of travel by making it possible to adjust the resilience of the pneumatic suspension device according to the desires of the operator.

From the foregoing it can be seen that the present invention provides a pneumatic suspension device which may be substituted for the conventional springs of an automobile, which does not require oiling, greasing, and which is silent, non-rusting, and waterproof.

It is to be noted that the pneumatic suspension device is so constructed that it may be assembled and installed on an automobile and also demounted with minimum effort or trouble.

It will also be observed that the present pneumatic suspension device may be adjusted to provide various resiliencies to meet various conditions of travel, and to give great strength to the tube.

While the present invention has been described in connection with a preferred embodiment, it is understood that variations and modifications may be resorted to without departing from the spirit and scope of the invention as defined in the appended claims.

I claim:—

1. A pneumatic suspension device comprising a pneumatic tube, two tongues downwardly projecting and forming a recess, said recess being adapted to receive the axle of a vehicle, a protecting shield skirting the bottom of the tube and fitting around the axle, a clamping member fitting over the axle and under the shield, and means for securing the device to the chassis of an automobile.

2. A pneumatic suspension device comprising a reinforced pneumatic tube, two beaded tongues downwardly projecting therefrom adapted to receive the axle of an automobile, a protecting shield skirting the bottom of the tube and fitting under the axle, a clamping member extending over the axle and firmly holding the protecting shield and beaded tongues in place around the axle, two upwardly projecting beads on the top of said tube adapted to receive the channel beam of the chassis of an automobile, and two clinchers bolted to the beam securely holding the beads.

3. A pneumatic suspension device comprising a reinforced elongated pneumatic tube, two beaded tongues downwardly projecting therefrom and forming a recess therebetween adapted to receive the axle of an automobile, a protecting shield skirting the lower portion of the tube and fitting around the tongues and axle, a clamping member adapted to securely hold the shield and tube in position, two beads upwardly projecting located on the top of said tube forming a recess therebetween adapted to receive the channel beam of the automobile, a solid member located between the flanges of said channel beam adapted to maintain the said beads in spaced relation, and clinchers fitted around the beads and bolted on the channel beam.

4. A pneumatic suspension device comprising a reinforced elongated pneumatic tube, an air valve therein, two beaded tongues downwardly projecting therefrom and forming a recess therebetween adapted to receive the axle of an automobile, a protecting shield skirting the lower portion of the tube and fitting around the tongues and axle, a clamping member adapted to securely hold the shield and tube in position, two beads upwardly projecting located on the top of the said tube forming a recess therebetween adapted to receive the channel beam of an automobile, a solid member located between the flanges of said channel beam adapted to maintain the said beads in spaced relation, and clinchers fitted around the beads and bolted on the channel beam.

5. A pneumatic suspension device comprising an elongated rubber tube reinforced with fabric, an air valve therein, two beaded tongues downwardly projecting therefrom and forming a recess therebetween adapted to receive the axle of an automobile, a protecting shield of a yielding nature skirting the lower portion of the tube and fitting around the tongues and axle, a clamping member adapted to securely hold the shield and tube in position, two beads upwardly projecting located on the top of the said tube forming a recess therebetween adapted to receive the channel beam of the automobile, a solid member located between the flanges of said channel beam adapted to maintain the said beads in spaced relation, and clinchers fitting around the beads and bolted on the channel beam.

DIETRICH FRIEDRICH
OTTO WESEMEYER.